Patented May 17, 1927.

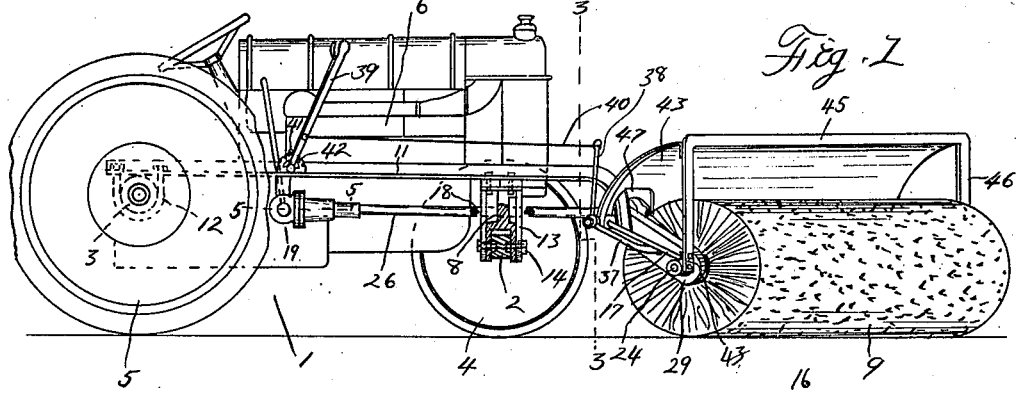
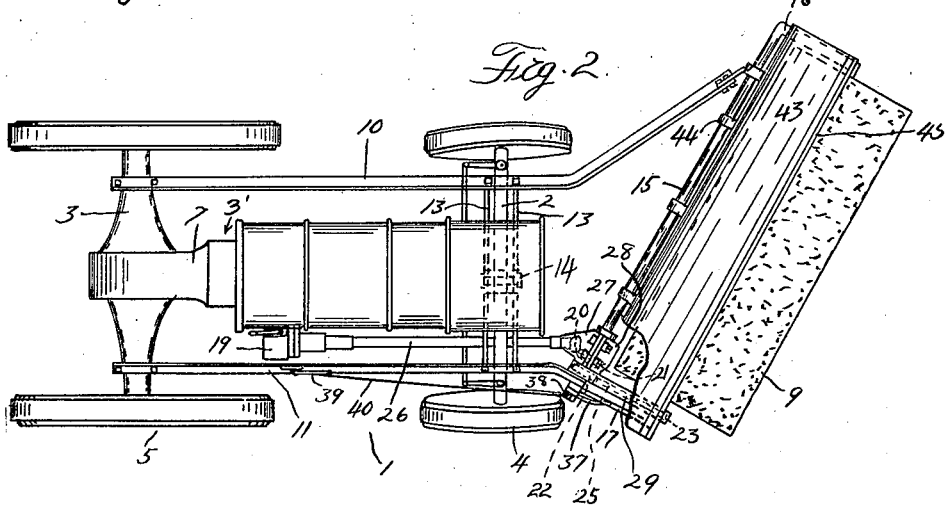
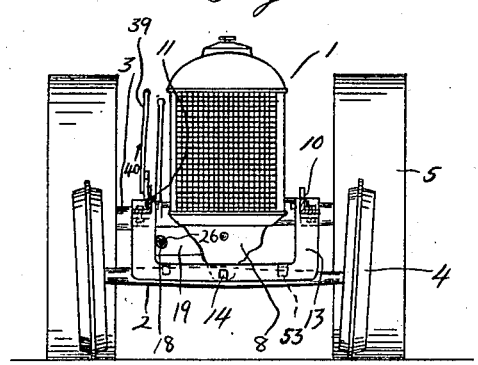
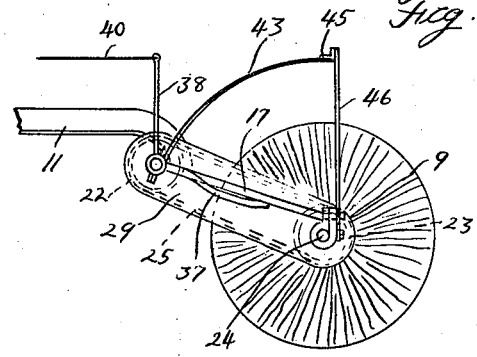
Inventor
Robert Simpson

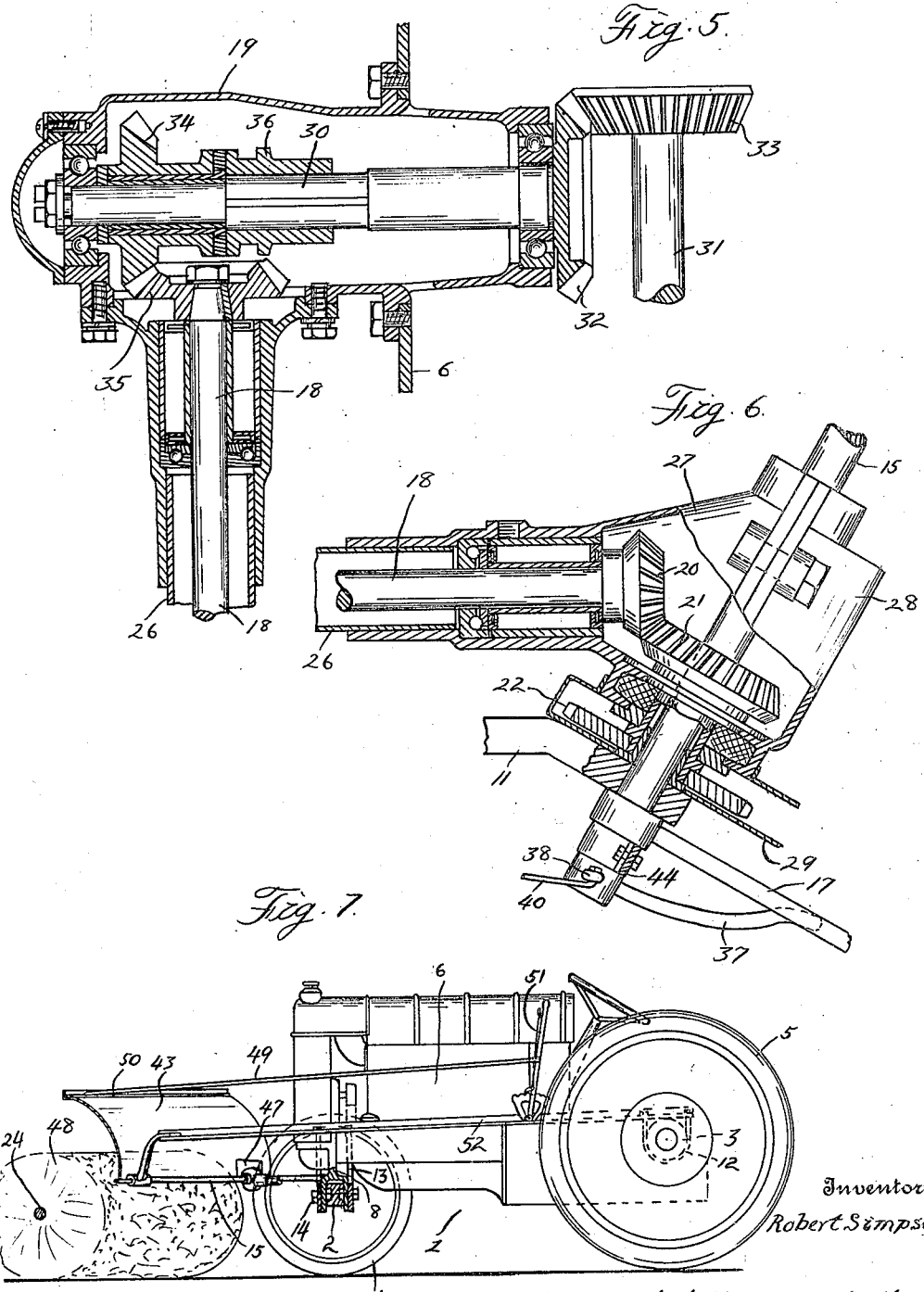

1,629,321

UNITED STATES PATENT OFFICE.

ROBERT SIMPSON, OF DETROIT, MICHIGAN, ASSIGNOR TO LEW W. SHAW, OF HIGHLAND PARK, MICHIGAN.

ROTARY SNOW-SWEEPER ATTACHMENT FOR TRACTORS.

Application filed February 13, 1922. Serial No. 535,982.

The invention relates to a rotary snow sweeper attachment for tractors and has for some of its objects the provision of a rotatable sweeper in advance of a tractor which is free to move vertically so that its travel over the ground will conform to the rises and depressions thereof; the provision of means for vertically adjusting the sweeper to hold the same at different heights relative to the ground; the provision of inclosed means for rotating the sweeper from the tractor engine; the provision of a shield between the tractor and rotary sweeper for protecting the driver of the tractor; and the provision of an auxiliary frame upon the tractor for the sweeper, which frame is connected to the tractor so that it is moved forward therewith through the rear axle housing of the tractor. Other objects of the invention reside in the novel features of construction and combinations and arrangements of parts as more fully hereinafter set forth.

In the drawings:

Figure 1 is a side elevation of a tractor with the rotary sweeper applied;

Figure 2 is a top plan view thereof;

Figure 3 is a cross section on the line 3—3 of Figure 1;

Figure 4 is an enlarged side elevation of a portion of the rotary sweeper attachment showing the device for vertically raising the rotary sweeper;

Figure 5 is a cross section on the line 5—5 of Figure 1;

Figure 6 is a sectional elevation showing the manner of inclosing the driving mechanism for the rotary sweeper;

Figure 7 is a side elevation of a tractor with a rotary sweeper attachment showing a modified construction for vertically raising the sweeper.

1 is the tractor having the front and rear axles 2 and 3 which support the body 3' and are carried by the front and rear wheels 4 and 5, the latter being driven from the body 3' through suitable transmission gearing within the housing 7. The front end of the engine 6 has the depending bracket 8 which is pivotally mounted at the center of the front axle 2.

The rotary sweeper attachment comprises the rotary sweeper 9 and an auxiliary frame including the side angle bars 10 and 11 which are mounted upon the tractor and are pivotally connected to the sweeper to permit of vertical movement thereof. These side bars have their rear ends detachably secured to the rear axle by suitable means such as the clips or brackets 12 and their forward ends are carried upon the front axle by the parallel bars 13 which in elevation are U-shaped, the centers of these bars being connected to the front axle by the pivot 14 which also connects the engine bracket 8 to the front axle, the arrangement being such that the auxiliary frame has a three-point support as well as the tractor frame. Also, with this arrangement, the propelling of the auxiliary frame with the rotary sweeper from the tractor is through the rear axle housing. The side bars 10 and 11 of the auxiliary frame are bent laterally outward, and the laterally bent portion of the side bar 10 is longer than that of the side bar 11 so that the rotary sweeper is inclined relative to the direction of travel. 15 is a rod journalled near its ends in the front ends of the side bars 10 and 11, and 16 and 17 are arms secured to this rod and at its ends and carrying at their free ends the rotary sweeper 9 which is journalled therein so that it may rotate.

To drive the rotary sweeper from the tractor engine, I have provided the power shaft 18 extending at the side of the engine and adapted to be operatively connected thereto through the power take-off mechanism within the housing 19 at the side of the engine. This power shaft has at its forward end the bevel gear 20 meshing with the bevel gear 21, which latter is non-rotatably secured to the sprocket wheel 22, this sprocket wheel being in turn connected to the sprocket wheel 23 upon the shaft 24 of the rotary sweeper by means of the sprocket chain 25, the construction being such that upon throwing the power take-off mechanism within the housing 19 into driving engagement with the engine crank shaft, the rotary sweeper 9 will be rotated.

To protect the driving mechanism from snow, dirt, etc., it is inclosed. In detail, the power shaft 18 is inclosed within the tubular housing 26 and the bevel gears 20 and 21 are inclosed within the complementary housing sections 27 and 28 bolted to each other around the rod 15. The sprocket chain 25 as well as the sprocket wheels 22 and 23 are also inclosed by the housing 29.

My power take-off mechanism as shown particularly in Figure 5 comprises the shaft 30 journalled in the housing 19 and extending transversely within the engine 6. This shaft is driven from the crank shaft 31 of the engine through the bevel gears 32 and 33 and has at its outer end the bevel gear 34 which is rotatably mounted upon the shaft and meshes with the bevel gear 35 secured to the power shaft 18. To operatively connect the shaft 30 to the bevel gear 34, there is the jaw clutch 36 longitudinally slidably splined upon the shaft 30 and adapted to engage the bevel gear.

To vertically raise the rotary sweeper 9, I have provided a bell crank rotatably mounted upon the rod 15 and having an arm 37 with its free end engaging under the arm 17 and an arm 38 extending upwardly and connected to the lever 39 by the rod 40. This lever 39 is pivotally mounted upon the side bar 11 of the auxiliary frame and is adapted to be secured in various positions of rotative adjustment by means of the dog 41 engaging the toothed segment 42 secured to the side bar.

To protect the driver of the tractor as well as the tractor from snow, dirt and the like flying off the rotary sweeper, there is the segmental or concave shield 43 having its lower edge secured to the rod 15 by the lugs 44 and carried at its upper edge upon the shaft 24 of the rotary sweeper by the iron frame 45 having the depending arms 46 rotatably mounted at their lower ends upon the shaft. This shield is cut away at 47 for the driving mechanism of the sweeper.

In the modification shown in Figure 7, the rotary sweeper 48 is vertically adjusted by means of the cable 49 secured to the top of the iron frame 50 of the shield and also secured to the hand lever 51 pivotally mounted upon the side bar 52 of the auxiliary frame having the longer laterally bent portion. This hand lever is secured in various positions of rotative adjustment by suitable means such as a dog engaging a toothed segment upon the side bar.

Still another feature of my invention is the provision of a stop 53 upon each of the U-shaped bars 13 engageable with the front axle 2 to limit the rotation of the bars relative to the axle.

What I claim as my invention is:

1. The combination with a tractor, of an attachment therefor including a forwardly extending supporting frame mounted upon said tractor, a diagonally extending rod journalled upon said supporting frame forward of said tractor, arms fixedly secured to opposite ends of said rod, a rotatable brush extending between and pivotally mounted upon said arms, a sprocket wheel secured to said brush at one end thereof substantially concentric with its pivot, a second sprocket wheel rotatably mounted upon said rod and connected to said first-mentioned sprocket wheel, and a driving connection between said second sprocket wheel and tractor.

2. The combination with a tractor, having a rear axle, a front axle, and a body secured to said rear axle and pivotally mounted upon said front axle near its middle, of a supporting frame comprising members on opposite sides of said tractor body secured to said rear axle and extending forwardly of said tractor body, a U-shaped member pivotally connected to said front axle by the pivot connecting said front axle and tractor body and carrying said supporting frame members, and a ground engaging member secured to said supporting frame forward of said tractor.

3. The combination with a tractor having a rear axle, of an attachment therefor including, a frame secured to said rear axle and projecting forwardly of said tractor, a rod connected to said frame, a rotary sweeper, arms connecting said rod and sweeper, and a concave shield extending adjacent the upper rear periphery of said sweeper, said shield being connected at its lower edge to said rod.

4. The combination with a motor vehicle having a power take-off, of an attachment therefor including a pair of bars extending forwardly from said vehicle, a rod carried by said bars in advance of said vehicle, a pair of arms carried by said rod, a rotary ground engaging member carried by said arms, and means for driving said ground engaging member including sprockets carried respectively by said rod and ground engaging member, an endless chain connecting said sprockets, a driving shaft operatively connected to said power take-off and gearing connecting said shaft to the sprocket on said rod.

5. The combination with a motor vehicle having a power take off and rear and front axles, of an attachment therefor including a pair of bars connected to said rear axle and extending forwardly from said vehicle, means connecting said bars to said front axle, a rod carried by said bars in advance of said vehicle, a pair of arms carried by said rod, a rotary ground engaging member carried by said arms, and means for driving said ground engaging member including sprockets carried respectively by said rod and ground engaging member, an endless chain connecting said sprockets, a driving shaft operatively connected to said power take-off, and gearing connecting said shaft to the seprocket on said rod.

6. In a device of the character described, a wheeled motor vehicle including an engine housing and a laterally extending casing connected to the housing, a power take-off shaft extending into said casing, a transmission shaft journaled in said casing, gears to connect the power take-off shaft and the transmission shaft, a slidable clutch for operating the gears for connecting the power take-off shaft with the transmission shaft, a propeller shaft connected with the transmission shaft, a horizontal frame secured to the vehicle and extending forwardly thereof, a rock shaft journaled upon said frame, a rocker arm mounted on the rock shaft, a rotatable brush journaled in the rock shaft, a driving connection between the rotatable brush and the propeller shaft, and means for rocking the rocker arm and rock shaft.

7. In a machine of the character described, a tractor having pivotally mounted brackets in the rear of the front axle, a frame secured to said brackets and projecting forwardly of the tractor and having connection with the front axle of the tractor, a rock shaft mounted on the frame, a brush rotatably carried by said rock shaft, means whereby to rotate the brush, and means whereby to rock the shaft to raise and lower the brush.

8. In a machine of the character described, a tractor, a frame having one end pivotally connected to the tractor in the rear of the front axle and intermediate its ends having connection with the front axle, one of the legs of the frame being longer than the other, a rock shaft mounted at the forward end of the frame and disposed obliquely to the rigid front axle of the tractor, a brush rotatably carried by said rock shaft, means whereby to rotate the brush, means whereby to rock the rock shaft to raise and lower the brush.

9. In a machine of the character described, a tractor, a frame pivoted to the tractor in the rear of the front axle and also having connection with the front axle and projecting forwardly of the tractor, a rock shaft mounted on the frame and at one end having a forwardly extending portion, an arm extending forwardly from the opposite end of the rock shaft, a brush rotatably carried by the said rock shaft between said forwardly extending portion and said arm, means whereby to rotate the brush, a rocker arm connected to the rock shaft, an operating lever mounted on the tractor and a connection between the lever and rocker arm whereby to rock the rock shaft and raise and lower the brush.

In testimony whereof I affix my signature.

ROBERT SIMPSON.